UNITED STATES PATENT OFFICE.

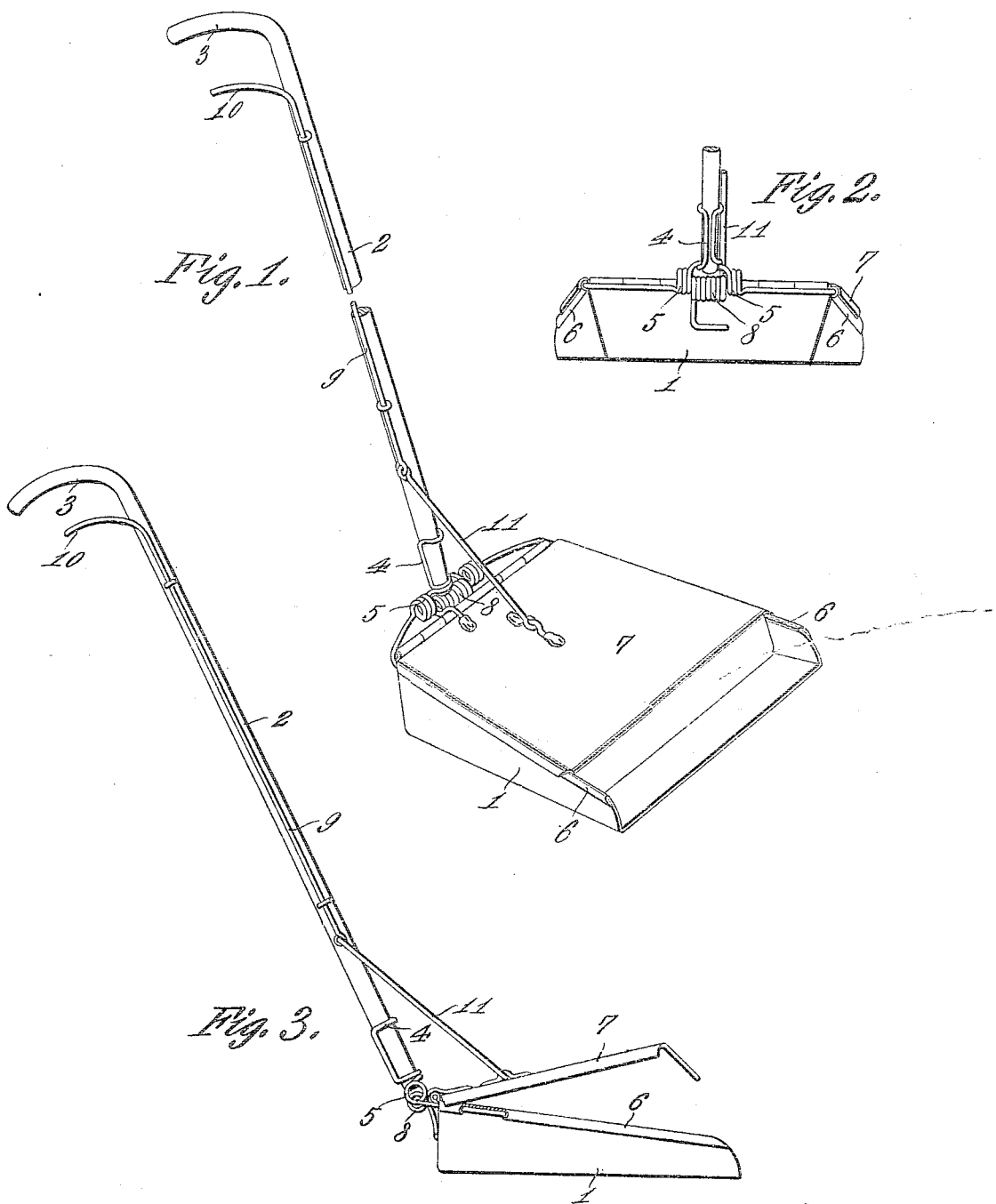

OLOF P. OLSON, OF BROADVIEW, SASKATCHEWAN, CANADA.

DUST-PAN.

953,756.

Specification of Letters Patent.

Patented Apr. 5, 1910.

Application filed July 28, 1909. Serial No. 510,146.

*To all whom it may concern:*

Be it known that I, OLOF P. OLSON, a subject of the King of England, residing at Broadview, in the Province of Saskatchewan, Canada, have invented certain new and useful Improvements in Dust-Pans, of which the following is a specification.

The object of this invention is to provide a simple and inexpensive form of dust pan for household use.

The invention resides in the peculiar manner of connecting the pan with a suitable handle by which it is manipulated, whereby the article may be used without bending over on the part of the operator.

A novel feature of the invention resides also in a peculiar form of cover for the dust receptacle and operating means for the latter.

For a full understanding of the invention reference is to be had to the following detail description and the accompanying drawings, in which—

Figure 1 is a perspective view of the dust pan embodying the invention; Fig. 2 is a rear elevation, and Fig. 3 is a side elevation showing the cover of the pan elevated.

Similar reference characters refer to similar parts throughout the drawings and description.

Describing the invention in detail and with reference particularly to the drawings the numeral 1 denotes the dust receptacle or pan body which in general shape is similar to those commonly in use. Extending upwardly and rearwardly from the receptacle 1 is a suitable handle 2 formed with a hand piece 3 curving rearwardly therefrom at its upper end. The handle 2 is peculiarly secured to the receptacle 1 by means of a wire structure. The above mentioned securing means are made from a single length of wire the middle portion of which is bent upon itself to form a socket frame 4 in which the lower end of the handle 2 is received and secured rigidly. From the socket frame 4 the wire ends are bent laterally and coiled to form spaced spring elements 5 after which they are bent outwardly and forwardly, the forwardly extending portions being engaged by flanges 6 at the upper side edges of the receptacle 1. A cover 7 is hinged at its rear end to the upper edge of the back of the receptacle 1 and said cover is normally held closed with reference to the receptacle by means of a spring 8 of coiled form, one end of the spring being attached to the rear portion of the cover and the opposite end of the spring being in proximity to the rear side of the back of the pan of the receptacle 1. The coiled portion of the spring 8 is arranged in proximity to the space between the elements 5 of the wire structure connecting the end and receptacle 1.

Mounted on the handle 2 is a slide rod 9 having a rearwardly extending hand piece 10 adjacent to the hand piece 3. The lower end of the slide rod 9 is connected by a link 11 with the top of the cover 7.

In operation it would be apparent that after the hand piece 10 is pulled upwardly the cover 7 will assume a raised or open position, the sweepings may then be swept into the receptacle 1 after which the hand piece 10 is released and the spring 8 forces the cover into closed position, which connection of the handle 2 and receptacle 1 is desirable since thereby a certain amount of yielding movement of the handle is permitted with reference to the receptacle so that the latter may be held closely against the surface of the floor.

Having thus described the invention what is claimed as new is:

A dust pan comprising a dust receptacle, a handle extending outwardly from the back portion thereof, connecting means between the handle and the receptacle consisting of a piece of wire bent between its ends to form a socket frame receiving the lower end of the handle, opposite ends of the wire being bent laterally to form spaced spring elements and thence bent outwardly and forwardly, the forwardly projecting portions being attached to the receptacle, the handle being provided with a rearwardly extending hand piece, a slide rod mounted on the handle and having a hand piece approximate to that of the handle, a cover hinged to the rear or back portion of the receptacle, a link connecting the slide rod and cover, and a spring secured to the cover and engageable with the back of the receptacle to normally hold the cover in closed position.

In testimony whereof I affix my signature in presence of two witnesses.

OLOF P. OLSON.

Witnesses:
OLOF OLSON,
C. E. MILLIGAN.